A. MONTEITH, C. W. SHELDON & C. W. SMITH.
MAIL POUCH EXCHANGING APPARATUS.
APPLICATION FILED DEC. 2, 1907.
911,057.
Patented Feb. 2, 1909.
4 SHEETS—SHEET 1.
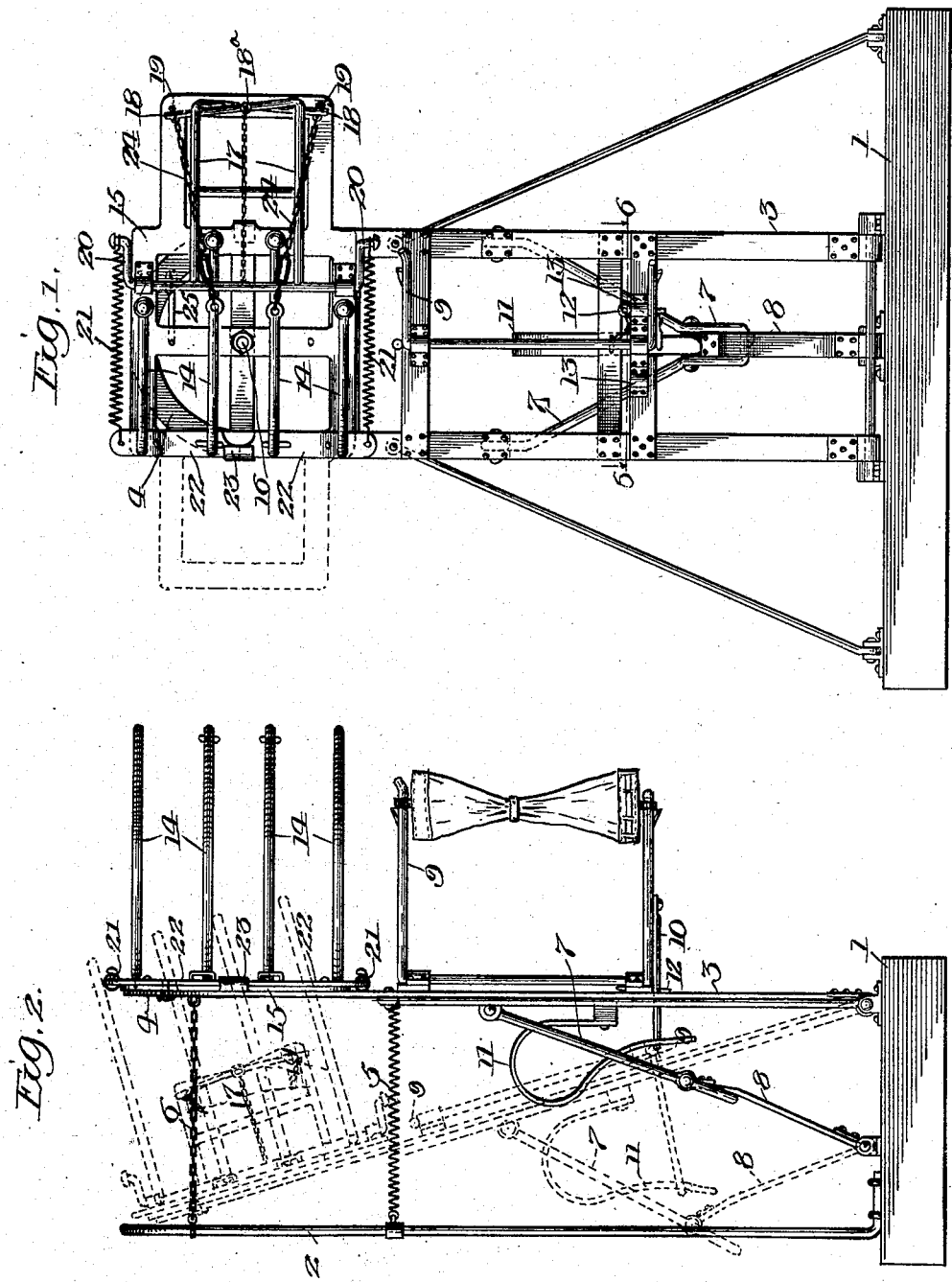

A. MONTEITH, C. W. SHELDON & C. W. SMITH.
MAIL POUCH EXCHANGING APPARATUS.
APPLICATION FILED DEC. 2, 1907.

911,057.

Patented Feb. 2, 1909.
4 SHEETS—SHEET 2.

Witnesses:

Inventors
Arthur Monteith
Charles W. Sheldon
Chester W. Smith
by Frank D. Thomason
Atty.

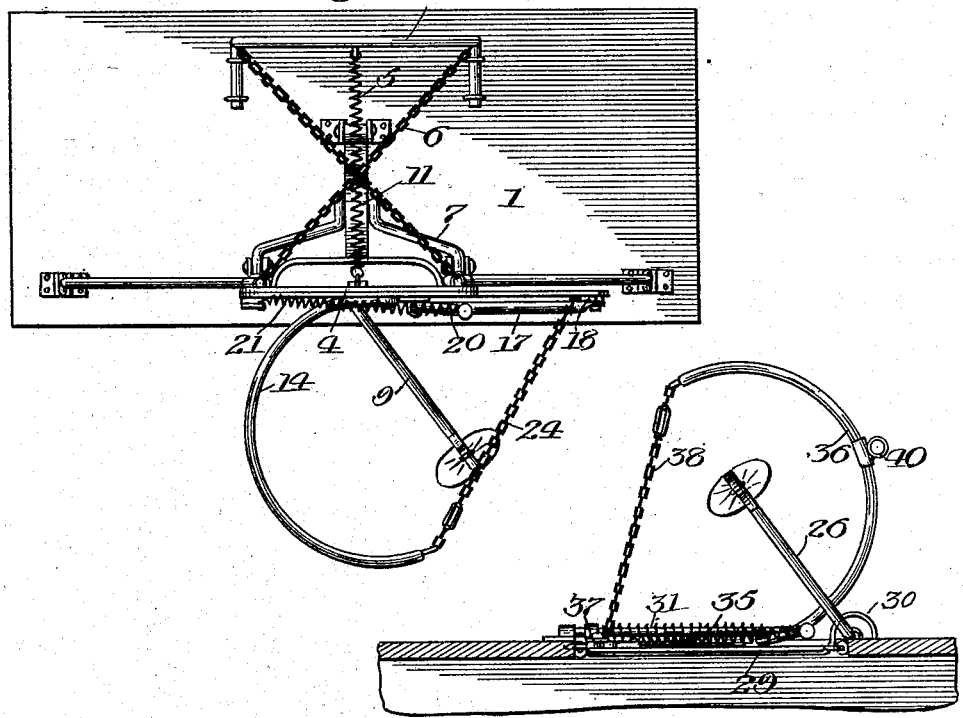
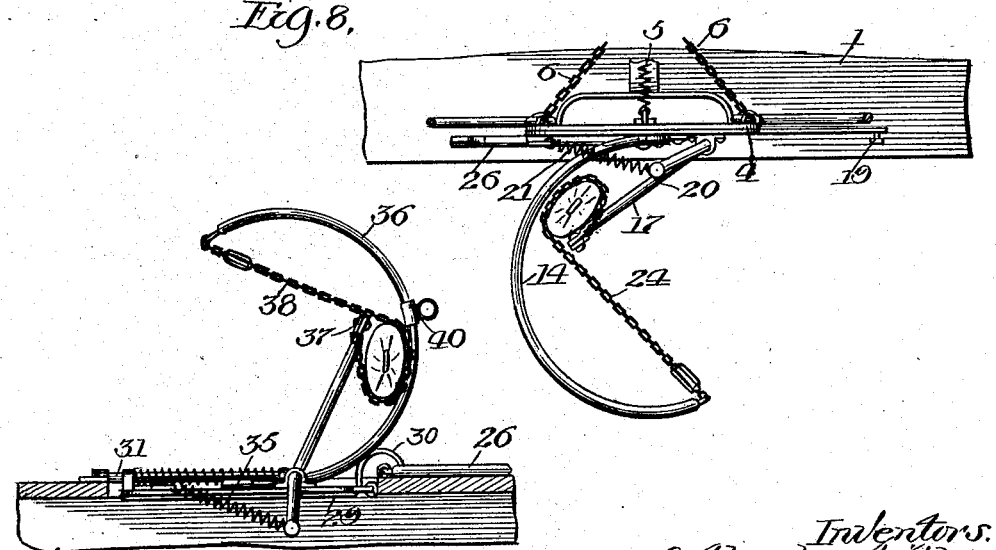

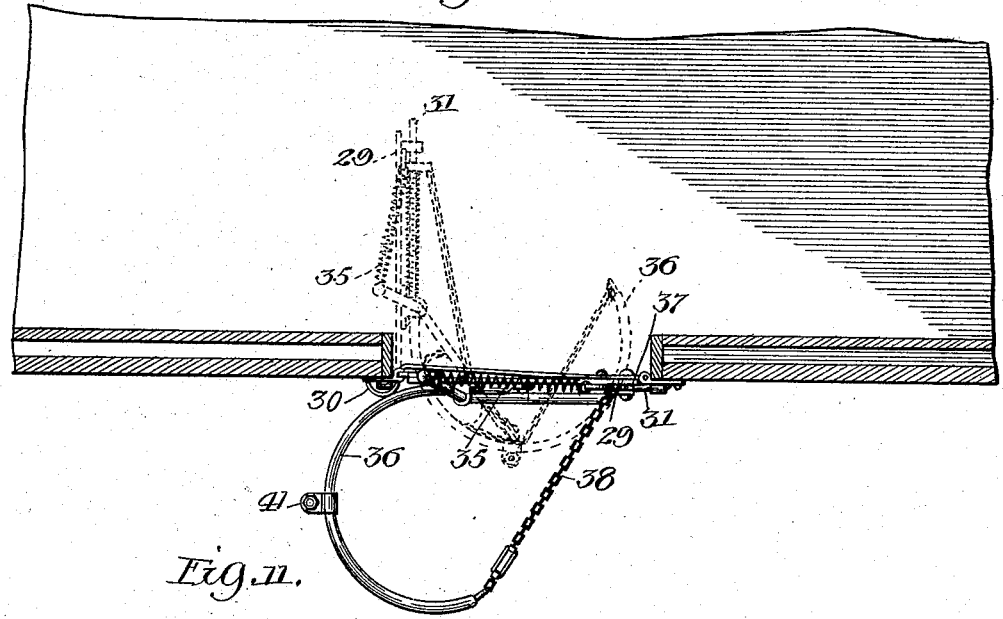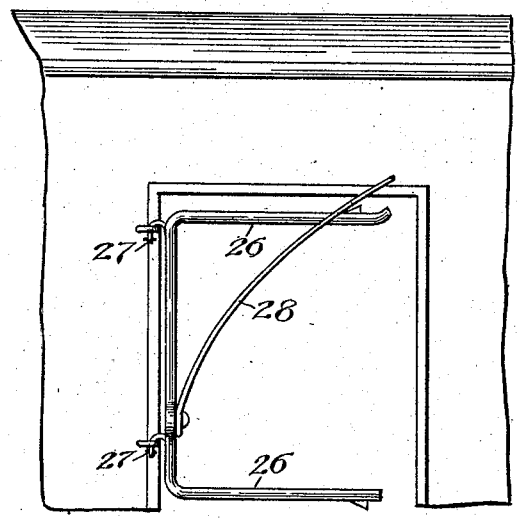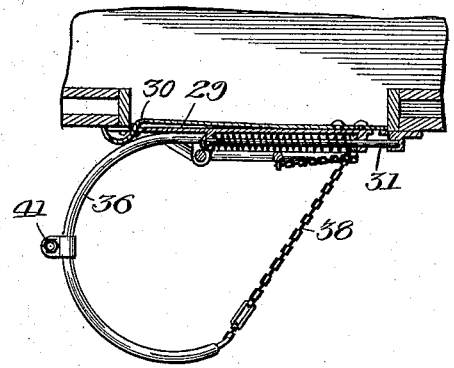

UNITED STATES PATENT OFFICE.

ARTHUR MONTEITH AND CHARLES W. SHELDON, OF LAPORTE, INDIANA, AND CHESTER W. SMITH, OF PAULDING, OHIO.

MAIL-POUCH-EXCHANGING APPARATUS.

No. 911,057.     Specification of Letters Patent.     Patented Feb. 2, 1909.

Application filed December 2, 1907. Serial No. 404,775.

*To all whom it may concern:*

Be it known that we, ARTHUR MONTEITH, of Laporte, Laporte county, Indiana; CHARLES W. SHELDON, of Laporte, Laporte county, Indiana, and CHESTER W. SMITH, of Paulding, Paulding county, Ohio, have invented certain new and useful Improvements in Mail-Pouch-Exchanging Apparatus, of which the following is a full, clear, and exact description.

This invention relates to apparatus for exchanging mail pouches at railway postal stations; that is, picking up and throwing off mail-bags or pouches from rapidly moving trains at the stations, and catching the pouches delivered from said moving trains at the said stations. This is done in such manner that the mail-pouch, when caught by the apparatus on the moving train or at the station, will be securely held until released therefrom by the mail clerk.

One of the objects of this invention is to provide an apparatus which, while placed only on one side of the track or on one side of the mail car, is adapted to be operated when a train is moving in either direction on said track, and to do this all the parts and adjustments are made reversible.

Another object is to so construct the apparatus that after the mail pouch has been caught by the same both on the car or at the station the apparatus for catching the same will be automatically released by the act of catching the pouch and be moved back out of the way far enough to afford no obstruction projecting beyond the vertical plane of the side of the mail car or alongside of the railway track.

These objects are accomplished in the manner hereinafter fully described and as more particularly pointed out in the claims.

Figure 3:
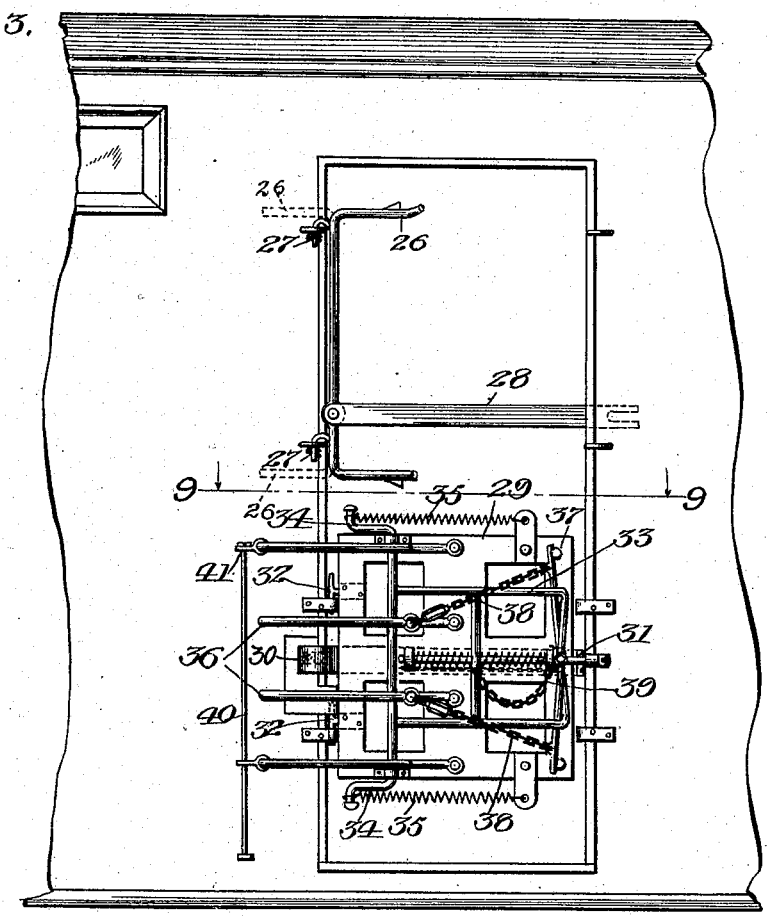
Figure 4:
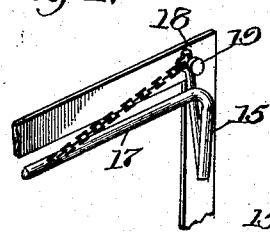
Figure 5:
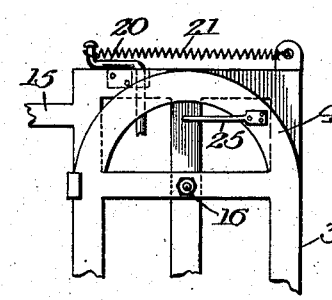
Figure 6:
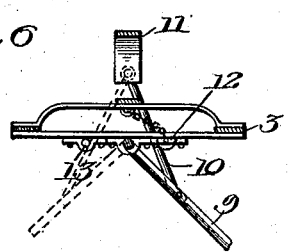

In the drawings:—Figure 1 is a front elevation of the road bed tower and apparatus supported thereby for receiving the bag or pouch delivered from the moving train and for holding the pouch to be taken up by the mail car. Fig. 2 is a vertical side elevation of the same showing in dotted lines the normally inclined position of the movable or swinging frame, after operation. Fig. 3 is a vertical side elevation of a portion of a mail car showing the catching and delivering apparatus applied to the door opening thereof, and in its adjusted position to catch and deliver the pouches. Fig. 4 is a detail perspective view of the latch used on the swinging trap door that holds the delivered pouch. Fig. 5 is a fragmental view of a portion of the top of the tower showing the same in rear elevation. Fig. 6 is a transverse horizontal section taken on line 6—6, Fig. 1. Fig. 7 is a top plan view, somewhat diagrammatical showing the relative arrangement and adjustment on the parts of the car and tower, just before the car passes the tower. Fig. 8 is a similar view showing the position of the same parts, after the car has passed the tower and the pouches have been transferred or exchanged. Fig. 9 is a horizontal section taken on line 9—9 Fig. 3 showing the pouch catching frame on the car in its adjusted position, and showing in dotted lines the normal position thereof after taking up a pouch. Fig. 10 is a horizontal section through the catcher-frame on the car showing in detail the latch for holding the same in adjusted position. Fig. 11 is a front elevation of the upper portion of the doorway of a mail car showing the manner of adjustably holding the pouch hanger when not in use.

Referring to the drawings, 1 represents a suitable base or platform upon which the tower of this mail-bag transferring apparatus is mounted and which is placed at a suitable distance from the road-bed to provide the proper clearance between the tower and the side of the trains. This tower consists, preferably, of a stationary vertical frame 2, and a tiltable or swinging tower 3 that has its upper portion 4 made segmental or semicircular as shown. These frames are preferably both rectangular in shape and are made of metal or angle-iron as desired. This tiltable tower frame 3 normally rests against the stationary vertical frame through the tension of the coil spring 5, that connects the upper ends of the same, and the outward movement of this tower is limited by a chain 6 connecting the same at or near its top with the vertical frame.

In order to retain the tower in its operative position a suitable knuckle is preferably disposed between the same and the platform. This knuckle is made in two parts one of which consists of a substantially Y-shaped yoke 7 the bifurcated upper ends of which are hinged to the frame about midway its height while the lower end of said yoke is pivoted near its end to a link 8 the lower end of which latter is secured to the platform 1. The construction of this knuckle is such that, when the tiltable tower is in a vertical position, the hinge between the two parts thereof will be at a point past an imaginary line drawn between the hinge on the frame and the hinge on the base, while the tension of the spring 5 pulling against the upper portion of the tower retains the same in a vertical or upright position. The means supported by this tower for holding the pouch to be taken up by the moving train consists of a substantially U-shaped hanger 9 mounted in suitable bearings on said frame and connected by a link 10 to the free end of a C-shaped flat spring 11 secured to one of the cross-bars of the tower and projects to the rear therefrom. In order to adjust this hanger in the proper direction, that is, pointing towards a moving train, a stop pin 12 is inserted through a seat 13 on the frame so that the lower end thereof will engage with the link 10 to act as a stop. When a mail pouch is caught from this hanger by the catcher on the passing train, said hanger will move in the direction of the train until the link 10 has passed beyond the vertical plane of said hanger when the tension of the spring 11 will be exerted and will pull the same backward and cause said hanger to swing flat against the tiltable tower after having allowed the pouch to slip off its ends. At the same time the free end of said spring will press against the knuckle near its hinge with sufficient force to release or "break" the same and move it out of its adjusted position so that the tension of spring 5 pulling on the inclinable tower will draw the latter backward against the supporting-frame and out of the way of the moving train.

The means for catching the pouch from the train consists of a series of semi-circular hooks 14, that are mounted so as to project horizontally outwardly from a reversible frame-work 15. This frame is pivoted at its center by bolt 16 to one of the cross-bars of the tower and is provided with a laterally extended portion. Suitably journaled in bearings on this reversible frame and preferably in front of the secured ends of the hooks. is a gate 17 the upper and lower rails of which are made of spring-metal and bent transversely to their horizontal portion in order to provide latches 18 that engage stops 19 on the arms of frame 15, and said transverse portions are secured together at their centers of length by a pivot 18ª so that the releasing of one latch will release the other. The journals of this gate extend beyond their bearings and are provided with cranks 20 to the up-turned ends of which suitable coiled springs 21 are secured. The opposite ends of these springs are secured to the outer ends of suitable fulcrums 22 that are pivoted mediate their length to the frame and have their contiguous inner ends held by a lug 23. Chains 24 connect the upper ends of latches 18 with the outer ends of the hooks 14, and are adjusted by suitable turnbuckles so that they extend across the entrance of said hooks. When a pouch is to be caught from a moving train the gate 17 is thrown open and the latches 18 are set. When the pouch enters the arms or hooks 14 the force of the same striking either of the chains 24 will release both latches 18 and the gate 17 will close into the hooks, substantially in the position shown in Fig. 8 of the drawings. The result of this action binds the chain partially around the pouch and the tension of the spring keeps the door securely against the bar. When it is desired to exchange the pouches should the train be moving in the opposite direction on the same track (as on a single track road) the stop-pin 12 is placed in the opposite bearing and the hanger 9 pointed in the opposite direction. Spring latch 25 which adjustably holds the pivoted framework in place is then lifted from its seat and the entire frame-work at the top of the tower is revolved a half turn in a vertical plane on the pivot 16 or until the hooks 14 point in the opposite direction when the latch 25 will seat in the opposite hole in the frame-work.

Removably mounted in the upper portion of the sash of the mail-car door is a pouch-hanger 26 somewhat similar in outline and construction to hanger 9 on the tower, excepting that it is provided with downwardly turned L-shaped journals 27 that fit into bearings or eyes mounted on either side of the sash. Secured to this hanger near the lower end of the vertical portion thereof is a pivoted spring arm 28 that projects laterally therefrom normally at right angles to the arms. This spring arm 28 is long enough to reach inside of the car and across and past the opposite sash of the door where it is adapted to be held by the mail-clerk. Mounted in suitable bearings on the same side of the sash as hanger 26 is a suitable swinging frame 29, that is, preferably, kept normally within the car by means of an elongated hoe-shaped spring 30 and which is adjusted in its open position by a spring operated plunger 31 engaging the opposite sash. This swinging frame is provided with T-shaped journals 32 that engage suitable bearings on either side of the door in a manner similar to the hanger above described. This frame is provided with a skeleton gate 33, the vertical member of the rear portion of which has its ends extended beyond its bearings both at the top and bottom and is provided with suitable crank-shaped extensions 34. A coil contraction spring 35 is secured at one end to these extensions 34, and the opposite end thereof is secured to the edge of the frame. Suitable hook shaped catching arms 36, preferably semi-circular in shape and pointing in the direction of travel of the train, are secured to the swinging frame-work and are so arranged that they project outside of the vertical plane of the side of the car when adjusted in operative position. The upper and lower stiles of gate 33 are formed into latches 37 similar to latches 18 on the tower frame that have their ends connected to the ends of the catcher arms by means of chains 38. When the frame and gate are adjusted to catch the mail from the tower beside the roadway said gate is swung open and the latches set to hold the same in position similar to the operation of the same parts on the tower. When the pouch supported by hanger 9 on the tower starts to enter the hook shaped arms 36, it will first engage chains 38, which trip the latches 37 allowing the gate to immediately close into the arms and grip the pouch between the same and said arms and bind the chain about the pouch. This gate is connected by means of a chain 39 with the spring operated plunger 31, and, simultaneously with the closing of this gate, said plunger is automatically withdrawn from its seat, and the entire swinging frame-work 29 is thereby released and swung into the car so that it presents no obstruction whatever projecting out beyond the vertical plane of the outside of the car, substantially as shown in dotted lines in Fig. 9 of the drawings.

In order to provide for the releasing and reclining of the tower in a case where no mail is to be taken up by the moving train, a suitable rod 40 is slidably mounted in brackets 41, on the rear portion of the hooked arms 36 and is so arranged that its lower end extends below the horizontal plane of the lower arm of the hanger 9. As this rod passes said hanger it will engage one of the horizontal arms of the same and move it past the center of its hinges or bearings a distance sufficient to allow spring 11 to pull it back flat against said tower thereby breaking knuckle 7—8 allowing the tower to recline against its support.

It is necessary oftentimes to exchange mail on a single track road where trains traveling in both directions use the same track.
In order to do this both the hanger 26 and frame 29 on the car are made reversible. That is, they are adapted to be moved from one sash to the other of the doorway so that mail may be taken when a train is moving in an opposite direction. This is very simply accomplished by duplicating the bearings both for the hanger and those for the frame, upon the opposite sash and by adjusting and reversing the parts on the tower as hereinbefore described.

What we claim as new is:—

1. A mail-pouch exchanging apparatus comprising a reversible catcher and a reversible hanger mounted on a tiltable support.

2. A mail-pouch exchanging apparatus comprising a reversible catcher and a reversible hanger supported in juxtaposition to each other on an automatically tiltable tower.

3. A mail-pouch exchanging apparatus comprising a tower, means for tilting the same, a catcher mounted on said tower, and a hanger adapted to engage said means and automatically tilt said tower.

4. A mail-pouch exchanging apparatus comprising a tower, means for tilting the same, a catcher mounted on said tower, and a hinged hanger adapted to engage said means and automatically tilt said tower.

5. A mail-pouch exchanging apparatus comprising a tower, means for tilting the same, a reversible catcher mounted on said tower, and a reversible hanger adapted to engage said means and automatically tilt said tower.

6. A mail-pouch exchanging apparatus comprising a tower, means for tilting the same, a reversible catcher mounted on said tower, and a reversible hinged hanger adapted to engage said means and automatically tilt said tower.

7. A mail-pouch exchanging apparatus comprising a tower, devices for tilting the same, a catcher mounted on said tower, a hinged hanger also mounted on said tower, and means adapted to engage said hanger whereby said hanger actuates said tilting devices.

8. A mail-pouch exchanging apparatus comprising a tower, devices for tilting the same, a reversible catcher mounted on said tower, a reversible hinged hanger also mounted on said tower, and means adapted to engage said hanger whereby said hanger actuates said tilting devices.

9. A mail-pouch exchanging apparatus comprising a tiltable tower and a reversible catcher mounted thereon.

10. A mail-pouch exchanging apparatus comprising a tiltable tower, and a swinging pivoted hanger mounted thereon.

11. A mail-pouch exchanging apparatus comprising a tiltable tower, and a reversible pivoted hanger mounted thereon and adapted to swing transversly to said tower.

12. A mail-pouch exchanging apparatus comprising a tiltable tower, and a swinging hanger mounted thereon the operation of which automatically tilts said tower.

13. A mail-pouch exchanging apparatus comprising a tiltable tower, and a reversible swinging hanger mounted thereon the operation of which automatically tilts said tower.

14. In combination with a mail-pouch exchanging apparatus, a catcher comprising a series of segmental arms, and a spring-returnable hinged gate adapted to swing into and engage said arms.

15. In combination with a mail-pouch exchanging apparatus, a reversible catcher comprising a series of segmental arms, and a gate adapted to swing into and engage said arms.

16. In combination with a mail-pouch exchanging apparatus, a reversible catcher comprising a series of segmental arms, and a spring returnable hinged gate adapted to swing into and engage said arms.

17. In combination with a mail-pouch exchanging apparatus, a tiltable tower, a catcher mounted thereon comprising a series of segmental arms, and a gate adapted to swing into and engage said arms.

18. In combination with a mail-pouch exchanging apparatus, a tower, a catcher mounted thereon comprising a series of segmental arms, and a spring returnable hinged gate adapted to swing into and engage said arms.

19. In combination with a mail-pouch exchanging apparatus, a tower, a reversible catcher mounted thereon comprising a series of segmental arms, and a gate adapted to swing into and engage said arms.

20. In combination with a mail-pouch exchanging apparatus, a tower, a reversible catcher mounted thereon comprising a series of segmental arms, and a spring returnable hinged gate adapted to swing into and engage said arms.

21. In combination with a mail-pouch exchanging apparatus, a tiltable tower, a catcher mounted thereon comprising a series of segmental arms, and a spring returnable hinged gate adapted to swing into and engage said arms.

22. In combination with a mail-pouch exchanging apparatus, a tiltable tower, a reversible catcher mounted thereon comprising a series of segmental arms, and a spring returnable hinged gate adapted to swing into and engage said arms.

23. A mail-pouch exchanging apparatus comprising a tiltable tower, means for limiting the backward movement thereof, a bracing knuckle for retaining said tower in a vertical position, and devices for automatically releasing and tilting said tower.

24. A mail-pouch exchanging apparatus comprising a tiltable tower, a stationary vertical frame for limiting the backward movement thereof, a bracing knuckle for retaining said tower in a vertical position, and devices for automatically releasing and tilting said tower.

25. A mail-pouch exchanging apparatus comprising a tiltable tower, means for limiting the backward movement thereof, a spring actuated bracing knuckle for retaining said tower in a vertical position, and devices for automatically releasing and tilting said tower.

26. A mail-pouch exchanging apparatus comprising a tiltable tower, a stationary vertical frame for limiting the backward movement thereof, a spring actuated bracing knuckle for retaining said tower in a vertical position, and devices for automatically releasing and tilting said tower.

27. A mail-pouch exchanging apparatus comprising a tiltable tower provided with a reversible catcher, means for limiting the backward movement of said tower, a bracing knuckle for retaining said tower in a vertical position, and devices for automatically releasing and tilting said tower.

28. A mail-pouch exchanging apparatus comprising a tiltable tower provided with a reversible catcher, a stationary vertical frame for limiting the backward movement of said tower, a bracing knuckle for retaining said tower in a vertical position, and devices for automatically releasing and tilting said tower.

29. A mail-pouch exchanging apparatus comprising a tiltable tower provided with a reversible catcher, means for limiting the backward movement of said tower, a spring actuated bracing knuckle for retaining said tower in a vertical position, and devices for automatically releasing and tilting said tower.

30. A mail-pouch exchanging apparatus comprising a tiltable tower provided with a reversible catcher, a stationary vertical frame for limiting the backward movement of said tower, a spring actuated bracing knuckle for retaining said tower in a vertical position, and devices for automatically releasing and tilting said tower.

31. A mail-pouch exchanging apparatus comprising a tiltable tower, a reversible catcher mounted thereon, a stationary vertical frame for limiting the backward movement of said tower, a spring operating bracing knuckle for retaining said tower in a vertical position, a hanger mounted on said tower, and means adapted to engage said hanger whereby said hanger actuates said knuckle and tilts said tower.

32. A mail-pouch exchanging apparatus comprising a tiltable tower, a reversible catcher mounted thereon having arms projecting therefrom, a stationary vertical frame for limiting the backward movement of said tower, a spring operated bracing knuckle for retaining said tower in a vertical position, a reversible hinged hanger mounted on said tower, and means adapted to engage said hanger whereby said hanger actuates said knuckle and tilts said tower.

33. The combination with a railway car provided with a doorway in its longitudinal side, of a mail pouch catcher comprising a frame removably journaled in the sash of the doorway and provided with a series of segmental arms that project beyond the vertical plane of the side of the car.

34. The combination with a railway car provided with a doorway in its longitudinal side, of a mail pouch catcher comprising a frame journaled in the sash of the doorway and provided with a series of segmental arms that project beyond the vertical plane of the side of the car and a gate hinged on said frame and adapted to be released by the pouch caught by said arms.

35. The combination with a railway car provided with a doorway in its longitudinal side, of a mail pouch catcher comprising a frame journaled in the sash of the doorway and provided with a series of segmental arms that project beyond the vertical plane of the side of the car, and means carried by said frame whereby the same is automatically moved inside of said car by the action of catching the mail pouch.

36. The combination with a railway car provided with a doorway in its longitudinal side, of a mail pouch catcher comprising a frame journaled in the sash of the doorway and provided with a series of segmental arms that project beyond the vertical plane of the side of the car, a gate hinged on said frame and adapted to be released by the pouch caught by said arms, and means carried by said frame whereby the same is automatically moved inside of said car by the action of catching the mail pouch.

37. The combination with a railway car provided with a doorway in its longitudinal side, of a mail-pouch catcher comprising a frame hinged to the sash of said doorway and adapted to be automatically swung inside said car, a series of segmental arms mounted on said frame, locking devices for temporarily retaining said frame in adjusted position across said doorway, and means actuated by the mail-pouch for releasing said locking devices and permitting said frame to return to its normal position.

38. The combination with a railway car provided with a doorway in its longitudinal side, of a mail-pouch catcher comprising a frame hinged to the sash of said doorway and adapted to be automatically swung inside said car, a series of segmental arms mounted on said frame, locking devices for temporarily retaining said frame in adjusted position across said doorway, and a gate hinged on said frame and operatively connected to said locking devices, the operation of which releases said locking devices and permits said frame to return to its normal position.

39. In a mail-pouch exchanging apparatus the combination with a railway car provided with a doorway having a catcher mounted therein adapted to automatically swing inside said car, and a pouch-hanger mounted adjacent thereto, of a tiltable tower provided with a catcher and a hanger.

40. In a mail-pouch exchanging apparatus the combination with a railway car provided with a doorway having a catcher mounted therein adapted to automatically swing inside said car, and a pouch hanger mounted adjacent thereto, of a tiltable tower provided with a reversible catcher and a reversible hanger.

41. In a mail-pouch exchanging apparatus the combination with a railway car provided with a doorway having a catcher mounted therein adapted to automatically swing inside said car, and a pouch hanger mounted adjacent thereto, of a tower, means for tilting the same, a catcher mounted on said tower in horizontal alinement with and adapted to receive a pouch from the hanger on the car, and a hanger adapted to engage said tilting means and automatically tilt the tower when delivering a pouch to the catcher on the car with which it is in horizontal alinement.

42. In a mail-pouch exchanging apparatus the combination with a railway car provided with a doorway having a catcher mounted therein adapted to automatically swing inside said car, and a pouch hanger mounted adjacent thereto, of a tower, means for tilting the same, a reversible catcher mounted on said tower in horizontal alinement with and adapted to receive a pouch from the hanger on the car, and a reversible hanger adapted to engage said tilting means and automatically tilt the tower when delivering a pouch to the catcher on the car with which it is in horizontal alinement.

43. In a mail-pouch exchanging apparatus a car having a doorway, a swinging frame mounted therein, a series of segmental arms projecting therefrom, and a hanger also mounted in said doorway, in combination with a tower, means for tilting the same, a catcher mounted on said tower in horizontal alinement with and adapted to receive a pouch from the hanger on the car, and a hanger adapted to engage said tilting means and automatically tilt the tower when delivering a pouch to the catcher on the car with which it is in horizontal alinement.

44. In a mail-pouch exchanging apparatus a car having a doorway, a swinging frame mounted therein, a series of segmental arms projecting therefrom, a gate hinged on said frame adapted to be released by the pouch caught by said arms, and a hanger also mounted in said doorway, in combination with a tower, means for tilting the same, a catcher mounted on said tower in horizontal alinement with and adapted to receive a pouch from the hanger on the car, and a hanger adapted to engage said tilting means and automatically tilt the tower when delivering a pouch to the catcher on the car with which it is in horizontal alinement.

45. In a mail-pouch exchanging apparatus a car having a doorway, a reversible swinging frame mounted therein, a series of segmental arms projecting therefrom, and a reversible hanger also mounted in said doorway in combination with a tower, means for tilting the same, a catcher mounted on said tower in horizontal alinement with and adapted to receive a pouch from the hanger on the car, and a hanger adapted to engage said tilting means and automatically tilt the tower when delivering a pouch to the catcher on the car with which it is in horizontal alinement.

46. In a mail-pouch exchanging apparatus a car having a doorway, a reversible swinging frame mounted therein, a series of segmental arms projecting therefrom, a gate hinged on said frame adapted to be released by the pouch caught by said arms, and a reversible hanger also mounted in said doorway, in combination with a tower, means for tilting the same, a catcher mounted on said tower in horizontal alinement with and adapted to receive a pouch from the hanger on the car, and a hanger adapted to engage said tilting means and automatically tilt the tower when delivering a pouch to the catcher on the car with which it is in horizontal alinement.

47. In a mail-pouch exchanging apparatus a car having a doorway, a swinging frame mounted therein, a series of arms projecting therefrom, a gate hinged on said frame adapted to be released by the pouch caught by said arms, and a hanger also mounted in said doorway, in combination with a tower, means for tilting the same, a catcher mounted on said tower in horizontal alinement with and adapted to receive a pouch from the hanger on the car, and a hanger adapted to engage said tilting means and automatically tilt the tower when delivering a pouch to the catcher on the car with which it is in horizontal alinement.

48. In a mail-pouch exchanging apparatus a car having a doorway, a reversible swinging frame mounted therein, a series of arms projecting therefrom, a gate hinged on said frame adapted to be released by the pouch caught by said arms, and a reversible hanger also mounted in said doorway, in combination with a tower, means for tilting the same, a reversible catcher mounted on said tower in horizontal alinement with and adapted to receive a pouch from the hanger in the car, and a reversible hanger.

49. In a mail-pouch exchanging apparatus a car having a doorway, a swinging frame mounted therein, a series of arms projecting therefrom, a gate hinged on said frame adapted to be released by the pouch caught by said arms, and a hanger also mounted in said doorway, in combination with a tower, means for tilting the same, a catcher mounted on said tower in horizontal alinement with and adapted to receive a pouch from the hanger on the car, a gate hinged on said catcher adapted to be released by the pouch caught by said arms, and a hanger adapted to engage said tilting means and automatically tilt the tower when delivering a pouch to the catcher on the car with which it is in horizontal alinement.

50. In a mail pouch receiving and delivering device, a laterally projecting member, a spring arm movable to and from said member, and a flexible connection between said member and arm, adapted to embrace the pouch when the arm is released.

In testimony whereof we have hereunto set our hands and affixed our seals at Chicago, Cook county, Illinois, this 19th day of November, A. D., 1907.

ARTHUR MONTEITH. [L. S.]
CHARLES W. SHELDON. [L. S.]

Witnesses:
FRANK D. THOMASON,
E. K. LUNDY.

In testimony whereof I have hereunto set my hand and affixed my seal at Paulding, Paulding county, Ohio, this 27th day of November, A. D., 1907.

CHESTER W. SMITH. [L. S.]

Witnesses:
S. H. BARNES,
O. W. DONART.